United States Patent
Drum

[19]

[11] Patent Number: 6,047,754
[45] Date of Patent: Apr. 11, 2000

[54] DEVICE FOR MOUNTING SNOW CHAINS ON TIRES

[76] Inventor: Don M. Drum, 2902 34th St., Snyder, Tex. 79549

[21] Appl. No.: 08/919,007

[22] Filed: Aug. 27, 1997

[51] Int. Cl.[7] .................................................. B60C 11/00
[52] U.S. Cl. ..................... 152/213 R; 152/218; 152/219; 152/220; 152/241
[58] Field of Search ................ 152/213 R, 217, 152/218, 219, 220, 241

[56] References Cited

U.S. PATENT DOCUMENTS

| | | | |
|---|---|---|---|
| 1,246,132 | 11/1917 | Schlatter | 152/220 |
| 1,372,195 | 3/1921 | Rounds | 152/220 |
| 2,077,286 | 4/1937 | Tooley | 152/220 |
| 2,478,335 | 8/1949 | Stark | 152/241 |
| 2,710,038 | 6/1955 | Holzmueller, Sr. | 152/218 |
| 3,547,177 | 12/1970 | Valley | 152/220 |

FOREIGN PATENT DOCUMENTS

| | | | |
|---|---|---|---|
| 1196381 | 5/1958 | France | 152/220 |
| 2411722 | 8/1979 | France | 152/217 |
| 1480997 | 4/1969 | Germany | 152/220 |
| 215608 | 8/1989 | Japan | 152/220 |
| 364983 | 6/1932 | United Kingdom | 152/220 |

*Primary Examiner*—S. Joseph Morano
*Assistant Examiner*—Long Bao Nguyen
*Attorney, Agent, or Firm*—Smith & Danamraj, P.C.

[57] ABSTRACT

A device for mounting 3-railer snow chains having three runners on a set of double truck tires which are mounted on an outside wheel and an inside wheel. The device includes a non-elastic strap, a first wheel hook connected to a first end of the non-elastic strap for hooking the device to the inside wheel rim of the inside wheel, and a second wheel hook connected to a second end of the non-elastic strap for hooking the device to the outside wheel rim of the outside wheel. The device also includes a tightening mechanism such as a ratchet device for tightening the strap on the tires, and three chain hooks connected along the length of the strap. Each of the three chain hooks are positioned to engage one of the runners of the 3-railer snow chains. By driving forward or otherwise rotating the tire, the snow chains are tightly wrapped around the tire.

9 Claims, 4 Drawing Sheets

DEVICE FOR MOUNTING SNOW CHAINS ON TIRES

BACKGROUND OF THE INVENTION

1. Technical Field of the Invention

This invention relates to automotive and truck accessories and, more particularly, to a device for mounting snow chains on tires.

2. Description of Related Art

In many parts of the country and the world, winter driving requires the use of snow chains on tires in order to provide traction on icy and snowy roads. This is particularly true for large tractor-trailer trucks which are required by law in many jurisdictions to utilize snow chains during hazardous winter driving conditions.

FIG. 1 is a perspective view of a set of double-wide snow chains 10 which are typically utilized as traction devices on large trucks. The chains, or "3-Railer", are usually ¼-inch or ⅜-inch in diameter, and have three longitudinal runners 11–13 and a plurality of cross chains 14. The extensions 15 of the runners extend beyond the cross chains at one end to function as adjusting links. The other end of the runners has three half-links 16 which are utilized as hooks, and, when installed on the tires, are hooked into one of the adjusting links in the extended runners 15. The two outside runners each have a chain cam 17 which is utilized to tighten the chains as required for driving. A set of these chains are typically about eight feet long and are spaced approximately ten inches apart. The cross chains 14 are approximately 10 inches apart through the length of the chains.

FIG. 2 is a perspective view of a set of double truck wheels 21 and tires 22 mounted on a single axle 23. Wheel holes 24 enable a visual inspection of brake components (not shown), and provide access to valve stems for the tires 22. The wheels are manufactured with a wheel rim 25 where the tires are mounted. Snow chains are manufactured so that a single set of double-wide chains 10, covers both tires.

A set of double-wide snow chains weighs approximately 75 pounds. Therefore, without any assistance, these snow chains are extremely difficult for one person to install on the truck tires. To install the snow chains (i.e., "chain up"), the chains are draped over the dual truck tires to the ground. The truck is then backed up or pulled forward to roll over the chains so they can be fastened together with the hooks 16 and adjusting links 15. Slack in the snow chains, however, tends to follow the wheel as it turns. Therefore the hooks 16 and adjusting links 15 often do not reach each other after driving over the chains because the slack is held under the tire.

Alternatively, the driver may lay the chains out on the ground behind the tires, and then attempt to drive onto the chains. The two ends of the chain set must then be lifted and hooked together without any slack in the chains. This is difficult to accomplish, however, without creating undesirable slack in the chains, especially in the icy or snowy conditions which are typical.

There are no known prior art teachings of a solution to the aforementioned deficiency and shortcoming such as that disclosed herein. FIG. 3 is a prior art device which comprises a metal tube 31 through which a steel cable is run. A first cable section 32 extends from one end of the metal tube, and a second cable section 33 extends from the other end. Another cable section 34 extends from a hole 35 in the center of the tube. Hooks 36–38 are welded to the ends of the three cable sections. In use, the tube 31 is pushed through the wheel holes 24 on both the outside wheel 21a and the inside wheel 21b. This leaves cable section 32 and hook 36 hanging down on the outside of the outside wheel, cable section 34 and hook 37 hanging down between the two wheels, and cable section 33 and hook 38 hanging down on the inside of the inside wheel. The driver then hooks the three hooks onto one end of the snow chains, and drives the truck forward, thereby pulling the chains around the tires.

There are several disadvantages to this existing device. First, the wheel holes 24 on the outside wheel 21a and the inside wheel 21b must be aligned, or else the tube cannot be pushed through. In many cases, the wheel holes are not aligned, and the device is useless. Second, even when the wheel holes are aligned, the passageway is small due to the brake drums mounted therein. Additionally, in ice and snow conditions, the center area between the tires is often snow-packed, plugging the holes. Therefore, it is difficult to get the tube through the passageway. Finally, the cable and hooks hang down from the tube, and the hooks are near the ground. Thus, they are difficult to reach on the inside tire and between the tires.

In order to overcome the disadvantage of existing methods of installing snow chains on tires, it would be advantageous to have a device which is easily utilized by one person to securely anchor one end of a set of snow chains to a tire so that the chains can be wrapped around the tire without any slack. The present invention provides such a device.

SUMMARY OF THE INVENTION

In one aspect, the present invention is a device for mounting snow chains on a tire, the tire being mounted on a wheel having an inside rim and an outside rim. The device includes a non-elastic strap, a first wheel hook connected to a first end of the non-elastic strap for hooking the device to the inside wheel rim, and a second wheel hook connected to a second end of the non-elastic strap for hooking the device to the outside wheel rim. The device also includes a tightening mechanism for tightening the strap on the tire, and a plurality of chain hooks connected along the length of the strap for engaging a first end of the snow chains. By driving forward, or otherwise rotating the tire, the snow chains are tightly wrapped around the tire.

In another aspect, the present invention is a system for mounting snow chains on a tire, the snow chains having a leading edge, a trailing edge, and a plurality of chain hooks for connecting the leading edge to the trailing edge. The system includes a device for holding the leading edge tightly to the surface of the tire, and means for rotating the tire until the leading edge and the trailing edge can be connected.

In yet another aspect, the present invention is a device for mounting 3-railer snow chains having three runners on a set of double truck tires which are mounted on an outside wheel having an outside rim and an inside wheel having an inside rim. The device includes a non-elastic strap, a first wheel hook connected to a first end of the non-elastic strap for hooking the device to the inside wheel rim of the inside wheel, and a second wheel hook connected to a second end of the non-elastic strap for hooking the device to the outside wheel rim of the outside wheel. The device also includes a tightening mechanism such as a ratchet device for tightening the strap on the tires, and three chain hooks connected along the length of the strap, each of the three chain hooks being positioned to engage one of the runners of the 3-railer snow chains. By rotating the tire, the snow chains are tightly wrapped around the tire.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

Figure 1:
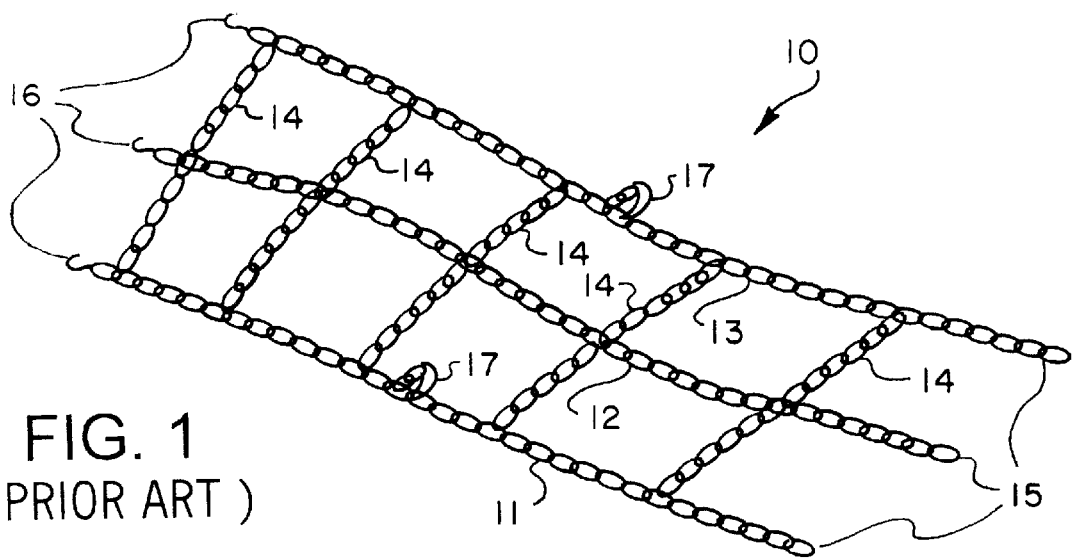
FIG. 1 (Prior Art) is a perspective view of a set of double-wide snow chains which are typically utilized as traction devices on large trucks.
Figure 2:
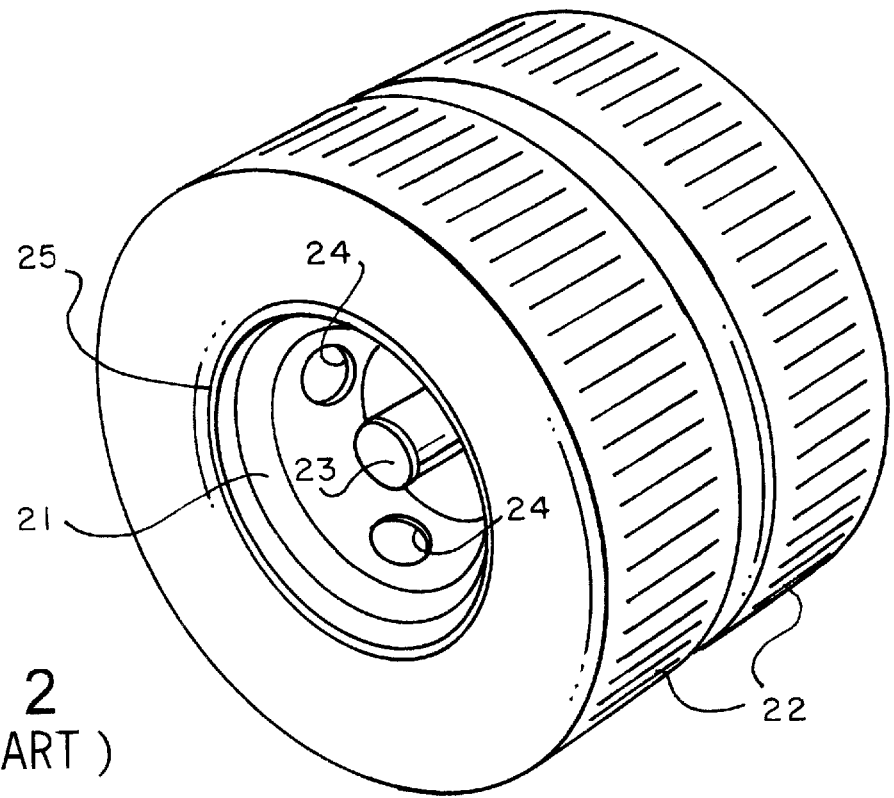
FIG. 2 (Prior Art) is a perspective view of a set of double truck wheels and tires mounted on a single axle.
Figure 3:
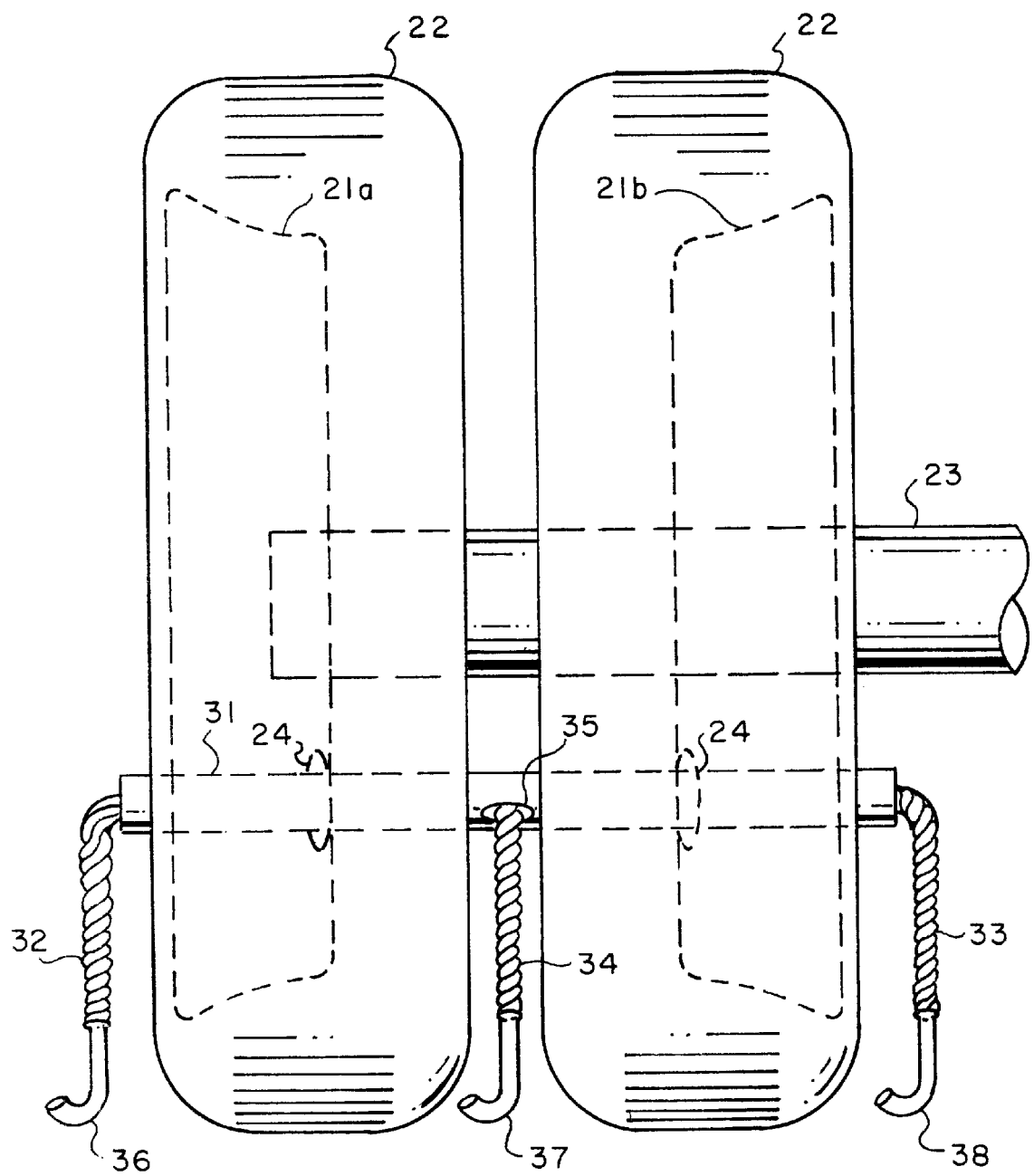
FIG. 3 (Prior Art) is an existing device for mounting snow chains which comprises a metal tube through which a steel cable is run.
Figure 4:
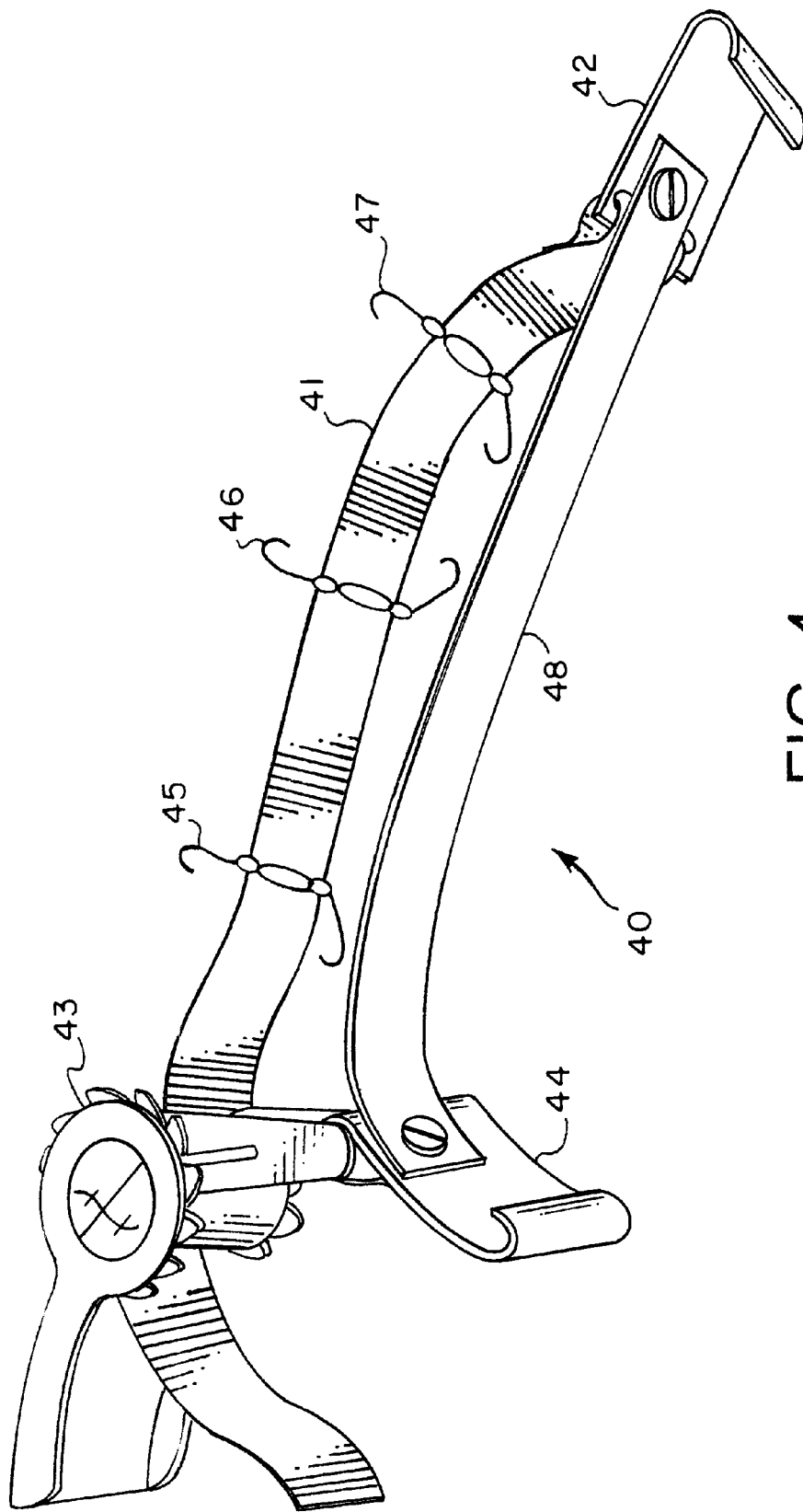
FIG. 4 is a perspective drawing of the preferred embodiment of the present invention.

FIG. 4 is a perspective drawing of the preferred embodiment of the present invention. The mounting device 40 includes a non-elastic strap 41 which may be constructed of a web cloth. At one end of the strap, a first wheel hook 42 is attached. The other end of the strap is fed through a ratchet device 43. A second wheel hook 44 is attached to the ratchet device. Three chain hooks 45–47 are adjustably attached to the strap 41. The two outside chain hooks 45 and 47 are oriented so that the hooks face outward from the tires when the device 40 is mounted on the tires. This orientation makes it easier to hook the extended chain runners 15 with the chain hooks. The center chain hook 46 is oriented so that the hooks face inward between the tires when the device 40 is mounted on the tires. This orientation prevents the center chain hook from grabbing the ground as the tires are rotated. An optional elastic strap 48, which may be, for example rubber, is shown attached to the wheel hooks 42 and 44.

Figure 5:
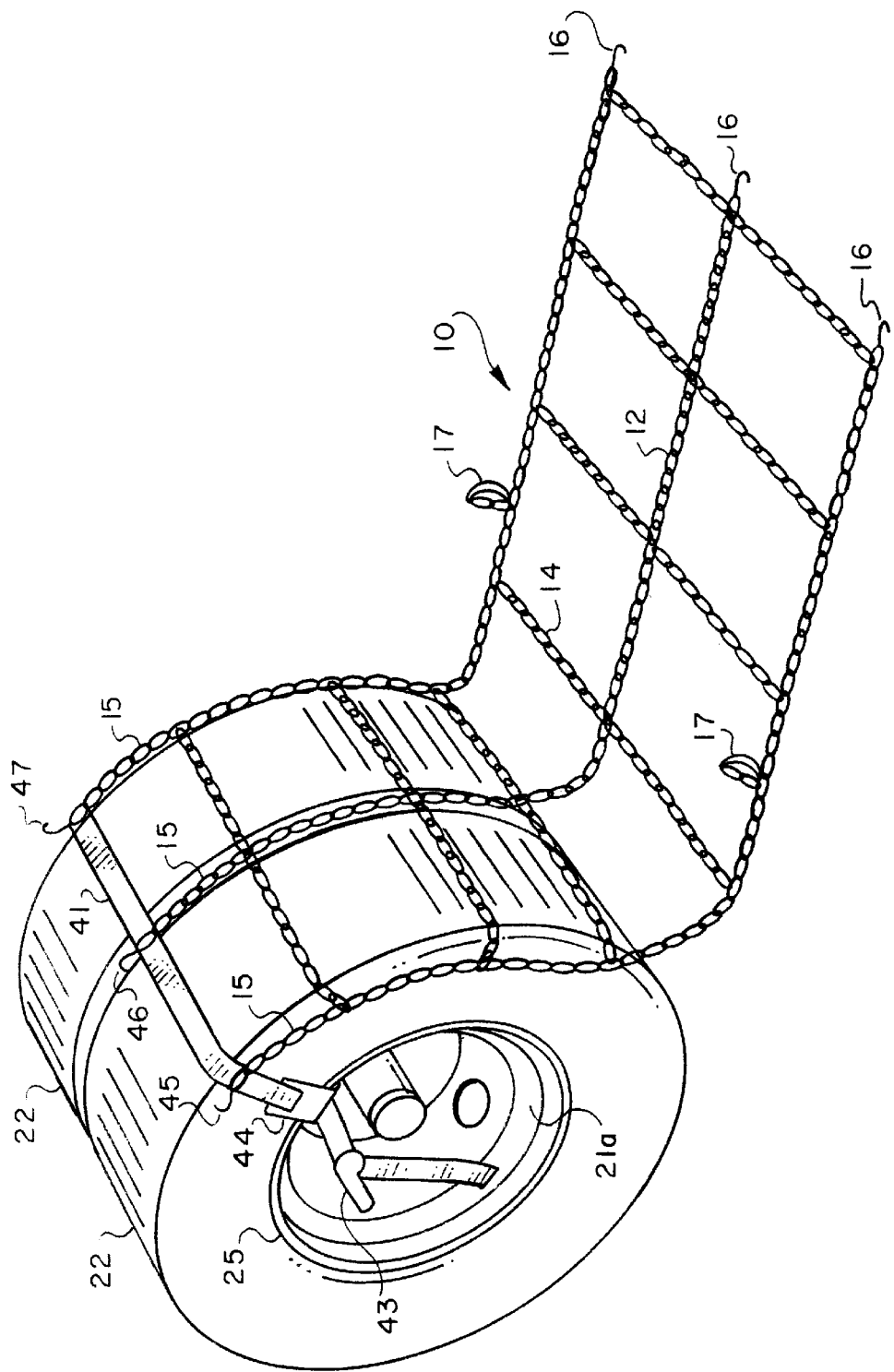
FIG. 5 is a perspective drawing of the device of the present invention mounted on a set of double truck wheels in accordance with the teachings of the present invention.

FIG. 5 is a perspective drawing of the device 40 of the present invention mounted on a set of double truck wheels in accordance with the teachings of the present invention. With reference to FIGS. 1, 2, 4 and 5, the operation of the present invention will now be described. The first wheel hook 42 is hooked to the wheel rim 25 of the inside wheel 21b. The second wheel hook 44 is hooked to the wheel rim of the outside wheel 21a. The ratchet device 43 is then utilized to tighten the strap 41. The optional elastic strap 48 may be utilized to hold the wheel hooks 42 and 44 on the inside and outside wheel rims 25 while the non-elastic strap 41 is adjusted through the ratchet device.

The extended runners 15 of the 3-railer snow chains 10 are then hooked onto the chain hooks 45–47, with the rest of the snow chains laid out behind the truck tires 22. The truck driver then drives forward for one rotation of the tires, or until the hooks 16 at the back end of the snow chains can be hooked into one of the links in the extended runners 15. The tight strap 41 and the weight and drag of the chains prevents any slack from forming in the chains as they are wrapped around the tires. The ratchet device 43 is then utilized to loosen the strap 41, and the device is removed from the tires by releasing the wheel hooks 42 and 44, and the chain hooks 45–47. The chain cams 17 are then utilized to tighten the chains as required for driving.

The present invention thus rolls the chains around the tires without creating any slack, and takes most of the work out of chaining up in an environment which is cold and usually snowing, raining, or icing. As is readily apparent, the device may be utilized on a single tire, and is not limited to sets of double truck wheels.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A device for mounting snow chains on a tire, said tire being mounted on a wheel having an inside rim and an outside rim, said device comprising:

a non-elastic strap;

a first wheel hook connected to a first end of the non-elastic strap for hooking the device to the inside wheel rim;

a second wheel hook connected to a second end of the non-elastic strap for hooking the device to the outside wheel rim;

a tightening mechanism for tightening the strap on the tire; and a plurality of chain hooks connected along the length of the strap for engaging a first end of the snow chains;

whereby, by rotating the tire, the snow chains are tightly wrapped around the tire.

2. The device for mounting snow chains on a tire of claim 1 wherein said tightening mechanism is a ratchet device.

3. The device for mounting snow chains on a tire of claim 1 further comprising an elastic strap connected to said first wheel hook and said second wheel hook in parallel with said non-elastic strap.

4. A device for mounting 3-railer snow chains having three runners on a set of double truck tires, said tires being mounted on an outside wheel having an outside rim and an inside wheel having an inside rim, said device comprising:

a non-elastic strap;

a first wheel hook connected to a first end of the non-elastic strap for hooking the device to the inside wheel rim of the inside wheel;

a second wheel hook connected to a second end of the non-elastic strap for hooking the device to the outside wheel rim of the outside wheel;

a tightening mechanism for tightening the strap on the tires; and three chain hooks connected along the length of the strap, each of the three chain hooks being positioned to engage one of the runners of the 3-railer snow chains;

whereby, by rotating the tires, the snow chains are tightly wrapped around the tires.

5. The device for mounting 3-railer snow chains on a set of double truck tires of claim 4 wherein said tightening mechanism is a ratchet device.

6. The device for mounting 3-railer snow chains on a set of double truck tires of claim 4 further comprising an elastic strap connected to said first wheel hook and said second wheel hook in parallel with said non-elastic strap.

7. A system for mounting snow chains on a tire, said snow chains having a leading edge, a trailing edge, and a plurality of chain hooks for connecting the leading edge to the trailing edge, wherein said tire is mounted on a wheel having an inside rim and an outside rim, said system comprising:

a device for holding the leading edge tightly to the surface of the tire, the device including:
- a non-elastic strap;
- a first wheel hook connected to a first end of the non-elastic strap for hooking the device to the inside wheel rim;
- a second wheel hook connected to a second end of the non-elastic strap for hooking the device to the outside wheel rim;
- a tightening mechanism for tightening the strap on the tire; and
- a plurality of chain hooks connected along the length of the strap for engaging the leading edge of the snow chains; and means for rotating the tire until the leading edge and the trailing edge can be connected.

8. The device for mounting snow chains on a tire of claim 7 wherein said tightening mechanism is a ratchet device.

9. The device for mounting snow chains on a tire of claim 7 further comprising an elastic strap connected to said first wheel hook and said second wheel hook in parallel with said non-elastic strap.

* * * * *